United States Patent [19]

Akiyama et al.

[11] Patent Number: 5,115,419

[45] Date of Patent: May 19, 1992

[54] DISC PLAYBACK DEVICE CAPABLE OF CONTINUOUSLY PLAYING BACK A PLURALITY OF DISCS

[75] Inventors: Hiroo Akiyama; Kazuhiro Tamada, both of Hamamatsu, Japan

[73] Assignee: Yamaha Corporation, Hamamatsu, Japan

[21] Appl. No.: 525,187

[22] Filed: May 16, 1990

[30] Foreign Application Priority Data

May 18, 1989 [JP] Japan .................................. 1-124681
Aug. 9, 1989 [JP] Japan .................................. 1-93571[U]
Aug. 9, 1989 [JP] Japan .................................. 1-206354

[51] Int. Cl.$^5$ ....................... G11B 17/22; G11B 17/26
[52] U.S. Cl. ......................................... 369/37; 369/38
[58] Field of Search ....................... 369/34, 35, 36, 37, 369/38, 39, 258, 199, 75.2, 77.1, 77.2

[56] References Cited

U.S. PATENT DOCUMENTS 4,519,055  5/1985  Gilson ..................................... 369/37
4,670,866  6/1987  Hasegawa et al. ................. 369/39 X
4,755,978  7/1988  Takizawa et al. ..................... 369/37

OTHER PUBLICATIONS

Magnavox (U.S. Philips Corp) "Smart" Advertisement copyright 1990, *Playbox* Dec. 1990 issue.
Magnavox Operating Instructions, CDC550/CDC552, Oct. 1989.

*Primary Examiner*—Stuart S. Levy
*Assistant Examiner*—Kenneth B. Wells
*Attorney, Agent, or Firm*—Spensley Horn Jubas & Lubitz

[57] ABSTRACT

A disc playback device capable of continuously playing back a plurality of discs such as Compact Discs includes a main body, a tray movable relative to the main body for being received in and drawn out of the main body, a rotary table mounted rotatably on the tray, and a plurality of disc holding sections formed about a rotation axis of the rotary table. A turntable, a disc clamper and a reproducing head are provided in the main body separately from the tray. A recess is formed in the radial direction of the rotary table in each disc holding section and opens outwardly at the outer periphery of the rotary table. A disc mounting mechanism is provided for setting a disc held in the disc holding section on the turntable and clamping it by the disc clamper. The tray is formed with an opening communicating with the recess of the disc holding section in a disc playback position. The tray can be drawn out of the main body by keeping clear of the turntable and the reproducing head through the recess of the disc holding section and the opening of the tray while the disc is being played back. The disc holding sections hold discs in an inclined position in the circumferential direction of the rotary table and presence or absence of discs is detected by a reproducing head when the rotary table is rotated. While the tray is moved in and out of the main body, a pickup servo gain is increased to stabilize playback of a disc while the tray is being moved.

16 Claims, 9 Drawing Sheets

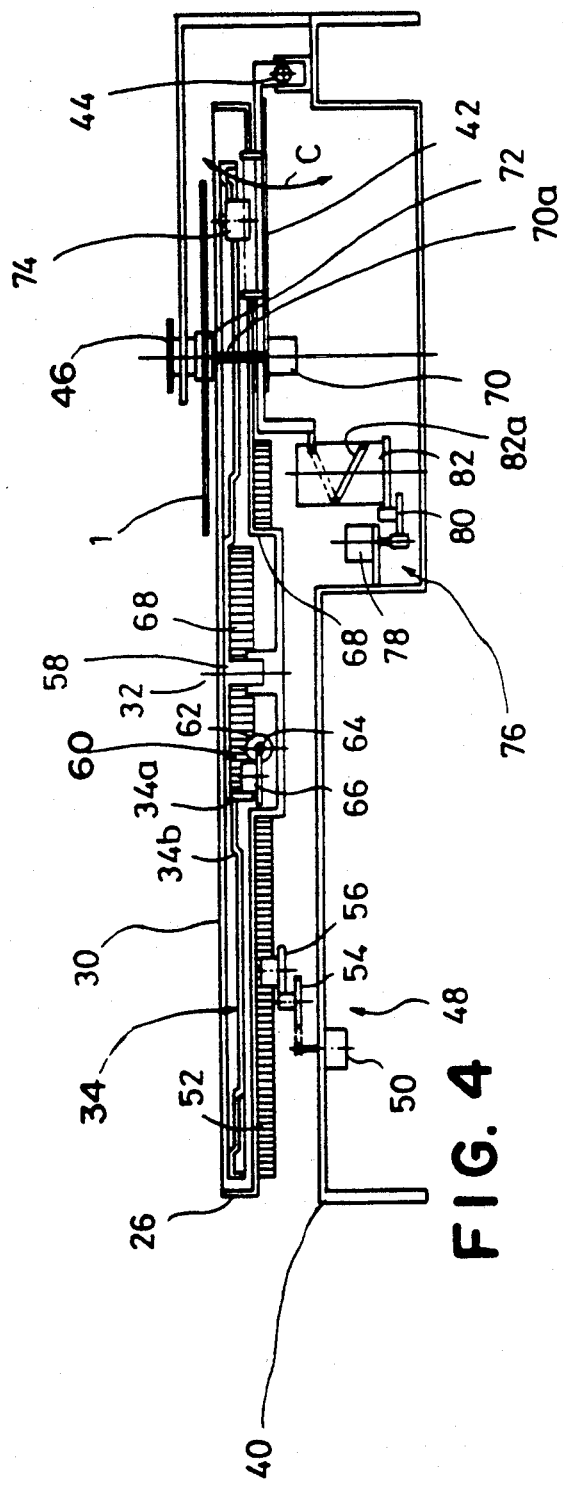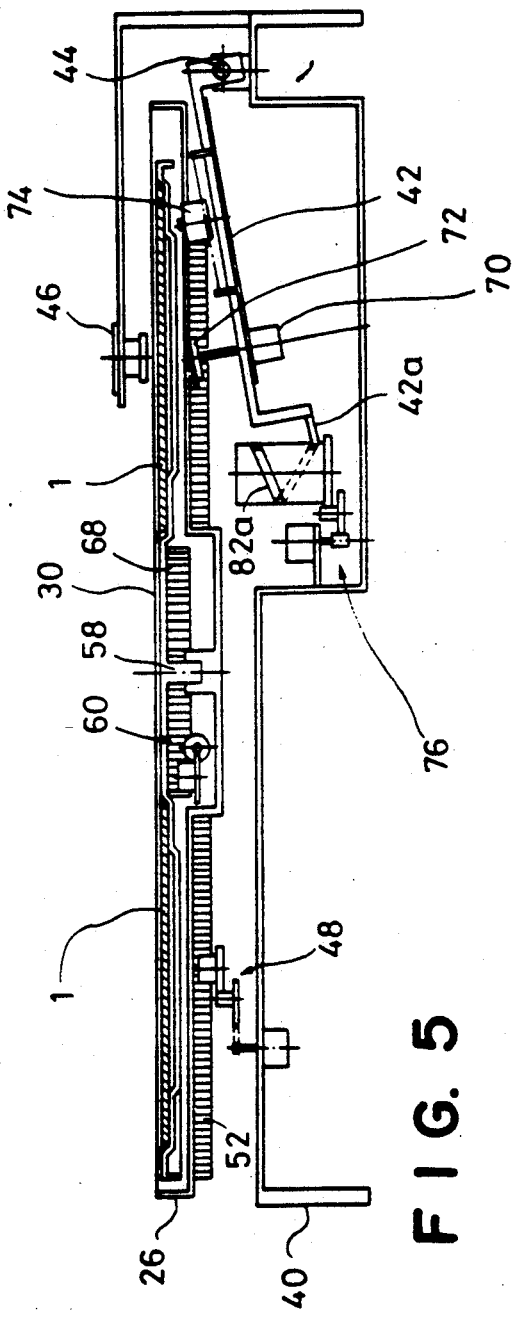

DISC PLAYBACK DEVICE CAPABLE OF CONTINUOUSLY PLAYING BACK A PLURALITY OF DISCS

BACKGROUND OF THE INVENTION

This invention relates to a disc playback device for playing back discs such, for example, as Compact Discs and, more particularly, to a disc playback device capable of continuously playing back a plurality of discs set on a rotary table in the device. Particularly, the invention contemplates to provide a disc playback device of this type in which one can draw out a tray carrying the rotary table and replace discs on the rotary table during playing back of a disc.

Known in the art are disc playback devices according to which a rotary table is provided on a tray and a plurality of discs ar set at a time on the rotary table so as to play back these discs continuously one after another. FIG. 2 shows one of such known disc playback devices. In this playback device, a tray 12 is displaced relative to a main body 10 of the playback device in the directions of arrows A to be received in or taken out of the main body 10. On the tray 12 is mounted a rotary table 14 which is rotatable in the directions of arrows B. A plurality of disc holding sections 18 are formed about a center of rotation 16. An opening 24 for inserting a turntable and a reproducing head therethrough is formed in each disc holding section 18. A clamper 20 is mounted on the rear end portion of the tray 12. On a chassis 22 in the main body 10 of the playback device are provided elements including the turntable and reproducing head (not shown).

After the tray 12 with the rotary table 14 on which discs are set has been received in the main body 10, the rotary table 14 is rotated to position one of the disc holding sections 18 above the turntable. Then, the turn table and the reproducing head are elevated and inserted into the opening 24. This cause the disc to be lifted by the turntable off the disc holding section 18 and to be clamped by the clamper 20. In this state, the disc can be rotated and played back by the reproducing head. In case discs are continuously played back, the turntable is lowered upon finishing of playback of one disc to restore the disc to the disc holding section 18 and then the rotary table 14 is rotated to position a next disc holding section 18 above the turntable for next playback.

According to the prior art disc playback device, playback of a disc must be stopped if disc set on the rotary table are to be replaced by other discs and it is not possible to draw the tray out of the main body of the device for replacing of disc while continuing playback of a disc.

It is the first object of the invention to provide a disc playback device enabling drawing of a tray out of a main body of the device for replacing of discs while performing playback of a disc.

In this type of disc playback device, it is necessary to detect presence or absence of a disc in each disc holding section of the tray after the tray has been received in the main body and before the discs are played back.

For detecting presence or absence of a disc in each disc holding section, there has been a prior art device in which light-emitting elements and light-receiving elements are provided on the tray in such a manner, that these elements face disc holding sections and a rotary table is rotated by 360 degrees so that presence or absence of a disc in each disc holding section is detected by detecting whether or not light emitted by the light-emitting element and reflected by the disc is received by the light-receiving element.

There is another device is which a rotary table is rotated by 360 degrees in a state in which laser beam is irradiated from a reproducing head (optical pick-up) so that presence or absence of a disc in each disc holding section is detected by detecting whether or not reflected laser beam is received by a light-receiving element in a reproducing head.

The prior art device having the light-emitting and light-receiving elements on the tray for detecting presence of absence of a disc requires the light-emitting elements, light-receiving elements, a drive circuit for driving these elements and a detection circuit respectively provided exclusively for this purpose with a result that the structure of the device becomes complex and the manufacturing cost becomes high.

The prior art device for detecting presence or absence of a disc by utilizing the reproducing head is simiplied in its circuit design. In this device, however, rotation of the rotary table is stopped at each disc holding section and an objective lens of the reproducing head is moved vertically to form a focus on the disc and detect its reflected beam for detecting presence or absence of a disc. The device therefore requires a considerable extra time for stopping rotation of the rotary table and vertically moving the objective lens.

It is, therefore, the second object of the invention to provide a disc playback device capable of detecting presence or absence of a disc in each disc holding section with a simple construction and in a short time.

Further, in this type of disc playback device in which discs on the tray can be replaced by other discs during playback of a disc, there is likelihood that a track jump occurs on a disc which being played back due to a shock caused by moving of the tray out of and into the main body of the device.

It is, therefore, the third object of the invention to provide a disc playback device capable of preventing occurrence of a track jump during playback of a disc due to a shock caused by moving of the tray.

SUMMARY OF THE INVENTION

For achieving the first object of the invention, the disc playback device comprises a main body of the disc playback device, a table formed with a plurality of disc holding sections in which a disc on which information is reproduceably recorded can be detachably held, table moving means for moving said table relative to said main body for being received in and drawn out of said main body, a reproducing protion provided in said main body separately from said table moving means for reproducing the information recorded on said disc, means for forming a recess in said disc holding sections of the table, said table being drawn out of said main body by keeping clear of said reproducing portion through said recess of the disc holding section while said disc held in one of said disc holding sections is played back by said reproducing portion.

According to the invention, when the operation for drawing out the table is performed during playback of a disc, the table can be drawn out by keeping clear of the reproducing means through the recess of the disc holding section so that discs can be replaced by drawing out the table while a disc is being played back.

In one aspect of the invention, the disc playback device comprises means for preventing manual rotation of the rotary table after the tray has been drawn out. According to this aspect of the invention, by simply moving the tray back toward the main body of the device the tray can be restored to the state in which it is received in the main body of the device with the turntable and reproducing head entering recess of the disc holding section through the opening of the tray.

For achieving the second object of the invention, each of the disc holding sections of the disc playback device is constructed in such a manner that a disc is held in an inclined state in the circumferential direction of the table and an objective lens of the reproducing head is positioned at a height at which a focus is formed at some point on the surface of the disc when the table is rotated whereby presence or absence of a disc is each of the disc holding sections is detected by whether a focus has been formed or not when the disc holding section passes over the reproducing head by the rotation of the table.

According to this aspect of the invention, each disc holding section is so constructed that it holds a disc in an inclined state in the circumferential direction of the rotary table and the object lens of the reproducing head is fixed at a height at which its focus is formed at any portion of the disc when presence or absence of the disc is to be detected. If, accordingly, there is a disc in the disc holding section, the relative distance between the disc and the objective lens gradually changes as the table is rotated and a focus is formed at any portion of the disc whereby presence of the disc is detected. If no focus is formed at any point, absencs of the disc is detected.

Accordingly, presence or absence of a disc can be detected by utilizing the time during which the table is rotated so that presence or absence of a disc can be detected in a short time without waste of time. Besides, since the detection is made by utilizing the reproducing head, complexity in the circuit design can be obviated.

For achieving the third object of the invention, the disc playback device comprises amplifiers of variable gain provided in a pickup servo loop, detection means for detecting starting of an operation for drawing or receiving the tray out of or into the main body, and control means for controlling, responsive to a detection signal from the detection means, the amplifiers so as to increase their gain.

According to the aspect of the invention, the increase in the pickup servo loop gain enables the deive to prevent occurrence of a track jump on a disc which is being played back due to a shock caused by moving of the tray out of and into the main body of the device.

If the pickup servo loop gain was always held high, heating of coil would increase, sound of moving parts of the actuator would increase and the drive current for the actuator would be disturbed with resulting adverse effect on signals reproduced from the disc. Since the loop gain is raised in the invention only when the tray is moved out of and into the main body of the device and the loop gain is restored to a normal level during normal playback of the disc, such inconvenience is held at the minimum.

The invention will noe described with reference to the accompanying drawings.

BRIEF DESCRIPTION OF THE DRAWINGS

In the accompanying drawing,

FIG. 4 is a sectional view of the device of FIG. 1 taken along lines D—D in FIG. 1 with the tray received in the main body of the device;

FIG. 5 is a sectional view of the device of FIG. 1 taken along lines D—D in FIG. 1 with a sub-chassis being in a lowered position;

DESCRIPTION OF PREFERRED EMBODIMENTS

Figure 1:
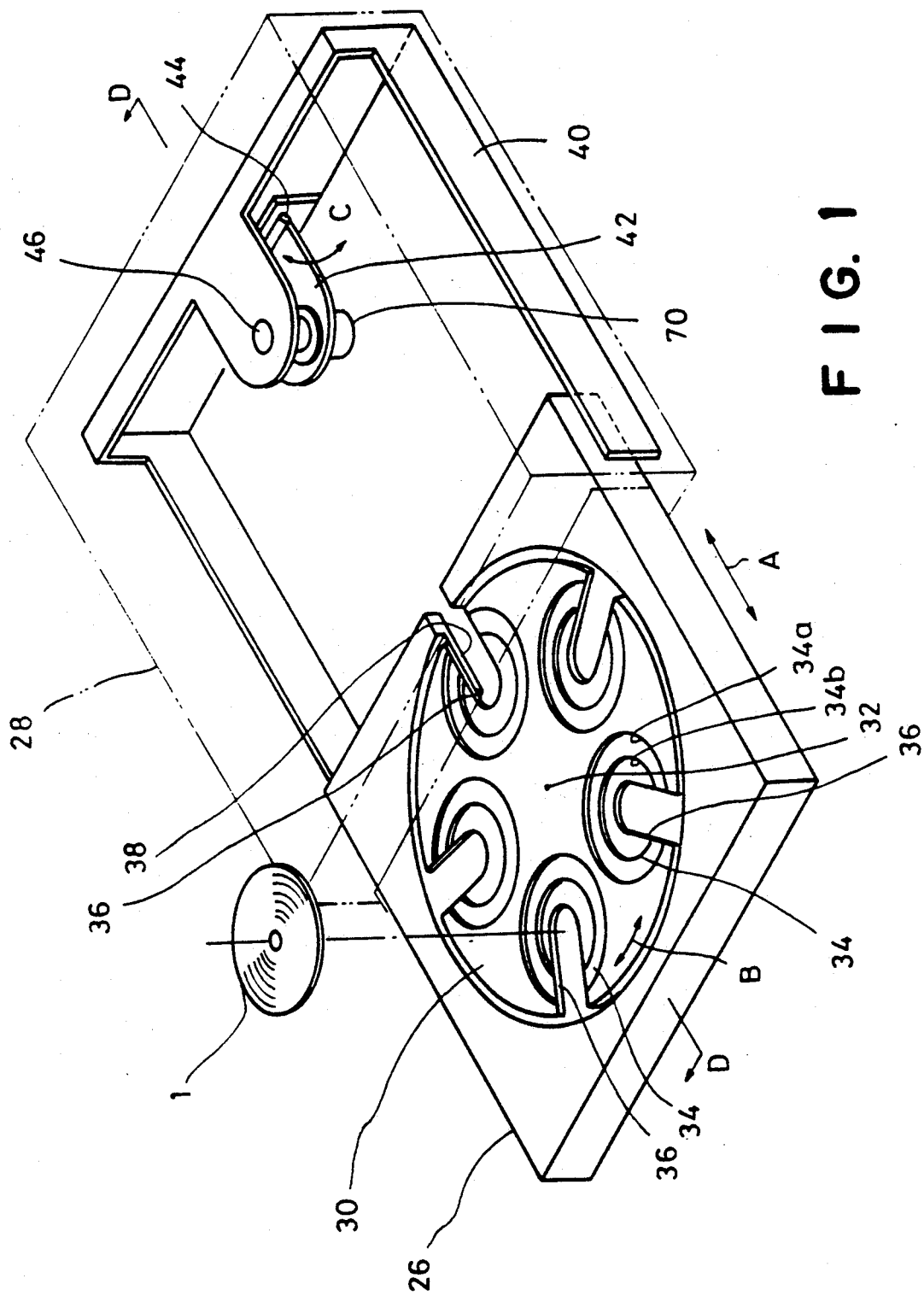
FIG. 1 is a perspective view of an embodiment of the disc playback device according to the invention.

FIG. 1 shows generally an embodiment of the disc playback device according to the invention. A tray 26 is drawin out of and received in a main body 28 of the device by moving in the directions of arrows $\overline{A}$. On the tray 26, a rotary table 30 is mounted rotatably in the directions of arrows B. A plurality (five in this embodiment) of disc holding sections 34 are formed on the rotary table 30 about its rotation center 32. Each disc holding section 34 has a depression 34a for holding a 12 cm Compact Disc (hereinafter abbreviated as "CD") and also a depression 34b for holding an 8 cm CD. A recess 36 is formed in the radial direction of the rotary table 30 in each disc hyolding section 34 from the central portion thereof and opening outwardly of the outer periphery of the rotary table 30. An opening 38 is formed at the center of the rear end portion of the tray 26. This opening 38 communicates with the recess 36 of the disc holding section 34 positioned opposite to this opening 38 and thereby enables the tray 26 to be drawn out by removing a turntable and reproducing head out of this opening 38.

At the center of the rear end portion of a chassis 40 in the main body 28 is provided a sub-chassis 42 having a turntable 72 and a reproducing head 74 (FIG. 4). This sub-chassis 42 is supported at a position under the tray 26 pivotably in the directions of arrows C by a pivot pin 44. A disc clamper 46 is provided fixedly in the chassis 40 at a position above the tray 26 and opposite to the turnable 72.

Figure 3:
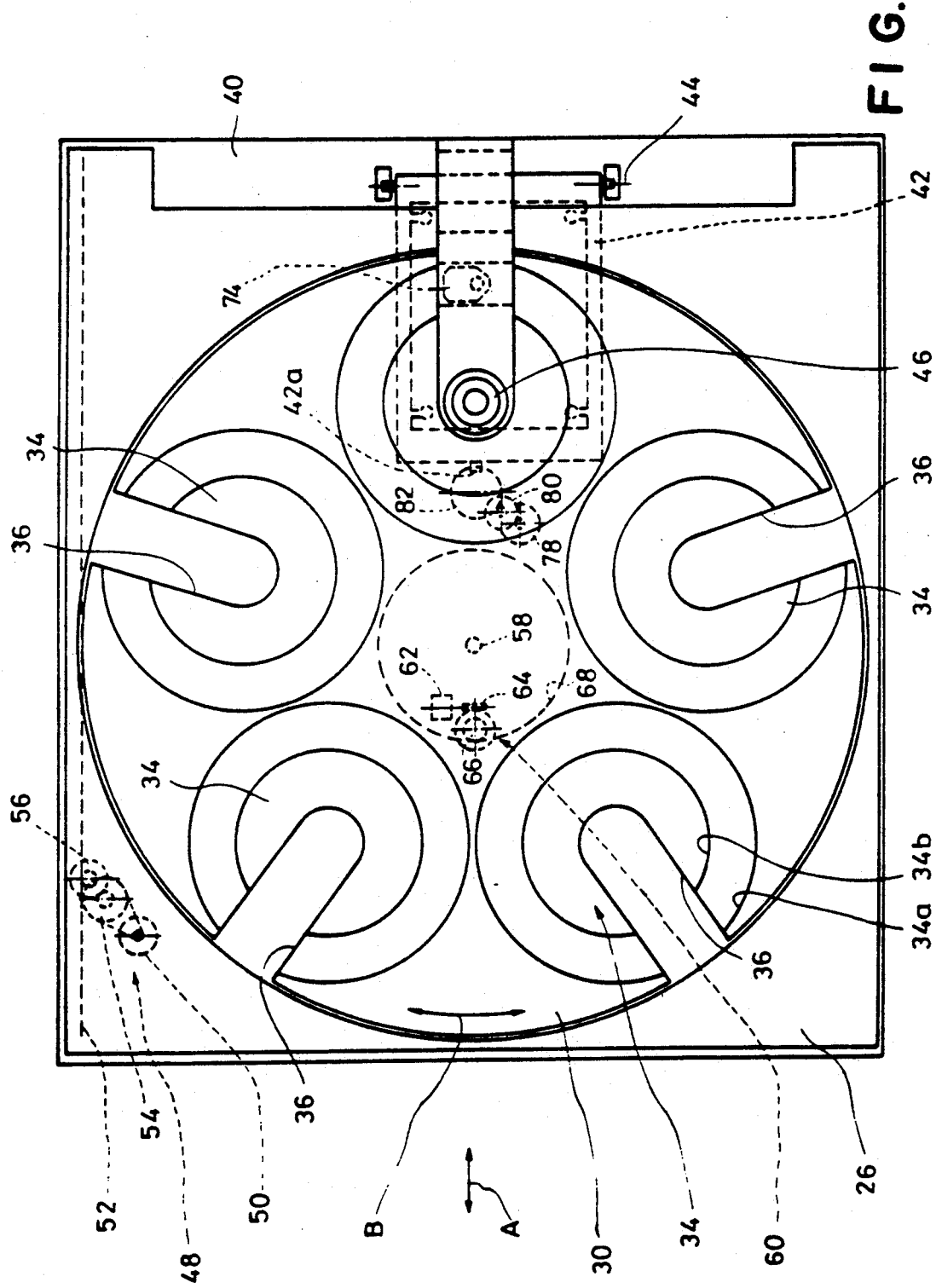
FIG. 3 is a plan view of the device according to the invention with the tray received in the main body of the device.

Details of the structure of the disc playback device of FIG. 1 are shown in FIGS. 3 and 4. These figures show the device with its case being removed. A tray drive mechanism 48 includes a motor 50, and a pulley 54 and a wheel 56 for transmitting the driving force of the motor 50, respectively provided on the chassis 40. The tray 26 is received in and drawn out of the main body 28 by transmission of the drive force from the wheel 56 to a rack 52 provided along the inner side surface of the lower portion of the tray 26.

The rotary table 30 is rotatably supported on the tray 26 by means of a spindle 58. A rotary table drive mechanism 60 includes a motor 62, a worm 64 fixed to the shaft of the motor 62, a gear wheel 66 meshing with this worm 64, respectively provided on the tray 26. The rotary table 30 is rotated by transmission of the drive force of the gear wheel 66 to a gear wheel 68 provided on the lower surface of the rotary table 30.

A disc motor 70 is provided on the sub-chassis 42 and the turntable 72 is mounted on a motor shaft 70a of the motor 70. The reproducing head 74 is provided on the sub-chassis 42 in such a manner that the reproducing head 74 is displaceable in the radial direction of the rotary table 30. A sub-chassis tilting mechanism (disc mounting mechanism) 76 has a motor 78, a gear wheel 80 for transmitting the drive force of the motor 78 and a cam drum 82 rotated by the gear wheel 80, respectively provided on the chassis 40. A spiral groove 82a is formed on the outer peripheral surface of the cam drum 82. By following of a foremost end portion 42a of the sub-chassis 42 along the groove 82a, the sub-chassis 42 is pivoted about the pivot pin 44.

As the sub-chassis 42 is pivoted upwardly, the turntable 72 and the reproducing head 74 are lifted to enter the recess 36 of one of the disc holding sections 34. A disc 1 is thereby placed on the turntable 72, lifted off the disc holding section 34 and clamped by the disc clamper 46. In this state, the disc 1 can be played back by the reproducing head 74.

As the sub-chassis 42 is pivoted downwardly, the disc 1 is restored on the disc holding section 34 as shown in FIG. 5 and the turntable 72 and the reproducing head 74 are removed downwardly from the recess 36. If other discs (not shown) set on the disc holding sections 34 are drawn out in the playback mode as shown in FIG. 4, the turnable 72 and the reproducing head 74 are removed in the horizontal direction from the recess 36 and the opening 38 so that the tray 26 can be drawn out of the main body 28 of the disc playback device while playback of the disc 1 is continued.

A series of operations in the playback mode of the above described playback device will now be described. When playback of a disc is to be made, the tray 26 first is drawn out of the main body 26. In this state, discs 1 are set in the four disc holding sections 34 excepting the innermost disc holding section.

Upon setting the discs 1 in the disc holding sections 34, the tray 26 is received in the main body 28 again and then a playback key is depressed. This rotary table 30 thereby is rotated and a first disc holding section 34 in which the disc 1 is set is positioned at a position corresponding to the turntable 72. The sub-chassis 42 is then lifted to place the disc 1 on the turntable 72 and cause the disc 1 to be clamped by the disc clamper 46. Upon clamping of the disc 1, the disc motor 70 is rotated and playback of the disc 1 is performed by the reproducing head 74.

Upon finishing of playback of one disc 1, the sub-chassis 42 is tilted downwarly as shown in FIG. 5 to restore the disc 1 on the disc holding section 34. Then, the rotary table 30 is rotated by a predetermined angle to position a next disc holding section 34 at a position corresponding to the turntable 72. The sub-chassis 42 is lifted again to place the new disc 1 on the turntable 72 for next playback. In this manner, continuous playback of the discs 1 is performed.

Figure 2:
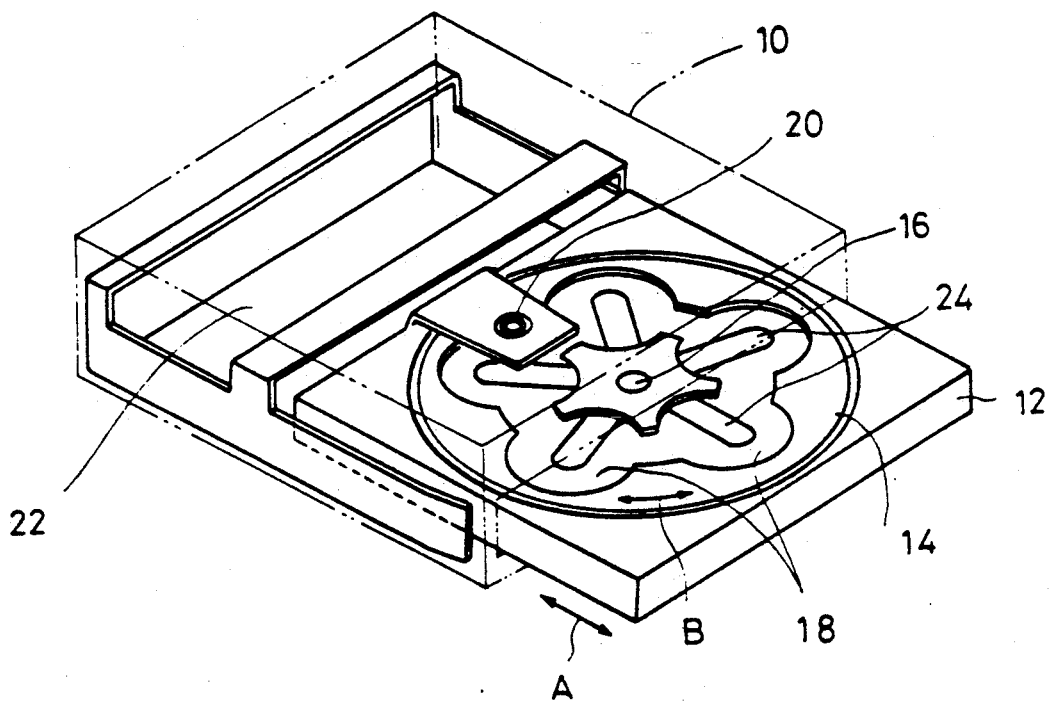
FIG. 2 is a perspective view of the prior art disc playback device.
Figure 6:
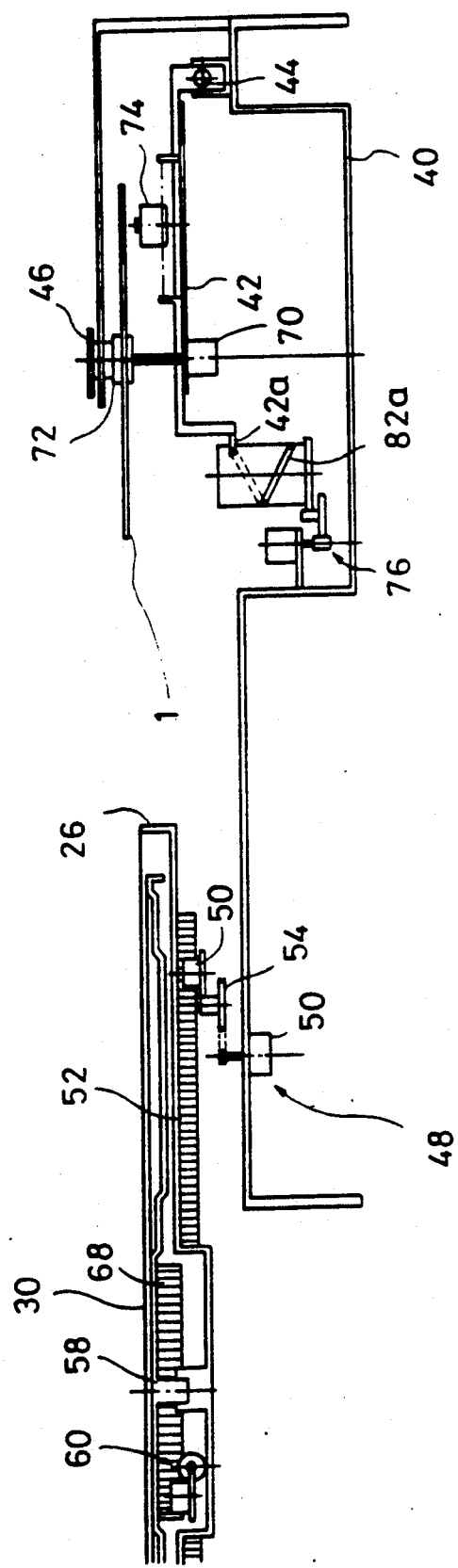
FIG. 6 is a sectional view of the device of FIG. 1 taken along lines D—D in FIG. 1 with the tray being drawn out during playback of a disc.

In the case where discs are to be replaced during playback of a disc, the tray 26 is drawn out of the main body 28. This state is shown in FIG. 6. Since the turntable 72 and the reproducing head 74 are drawn out of the recess 36 and the opening 38, playback of a disc can be continued. In the prior art device shown in FIG. 2 in which the clamper 20 is provided on the tray 12, a major portion of the tray 12 cannot be drawn out of the main body so that not more than one disc holding section can be exposed outside of the main body at a time. In the prior art device, therefore, replacing of discs must be performed one after another by rotating the rotary table 14. In contrast thereto, according to the invention, no clamper is provided on the tray 26 and this enables replacing of four discs simultaneously by drawing out a major portion of the tray 26.

Upon receiving of the tray 26 in the main body 28 again after replacing of the discs, the turntable 72 and the reproducing head 74 enter the opening 38 and the recess 36. Thus, the state of FIG. 4 is restored. In this manner, discs can be replaced without interrupting playback of a disc.

In the state where the tray 26 has been drawn out, the worm 64 and the gear wheel 66 of the rotary table drive mechanism 60 constitute a lock mechanism to prevent rotation of the rotary table 30 by hand. Accordingly, in storing the tray 26 in the main body 28 after replacing of discs, smooth entering of the turntable 72 and the reproducing head 74 in the opening 38 and the recess 36 can be ensured.

When playback is to be finished, a stop key is depressed. The sub-chassis 42 thereby is tilted downwardly as shown in FIG. 5. Then, by depressing a tray drawout key, the tray 26 can be drawn out and the disc can be removed. By making arrangement for rotating the rotary table 30 by manipulation of a switch, a disc held in the innermost disc holding section 34 can be removed.

Figure 7:
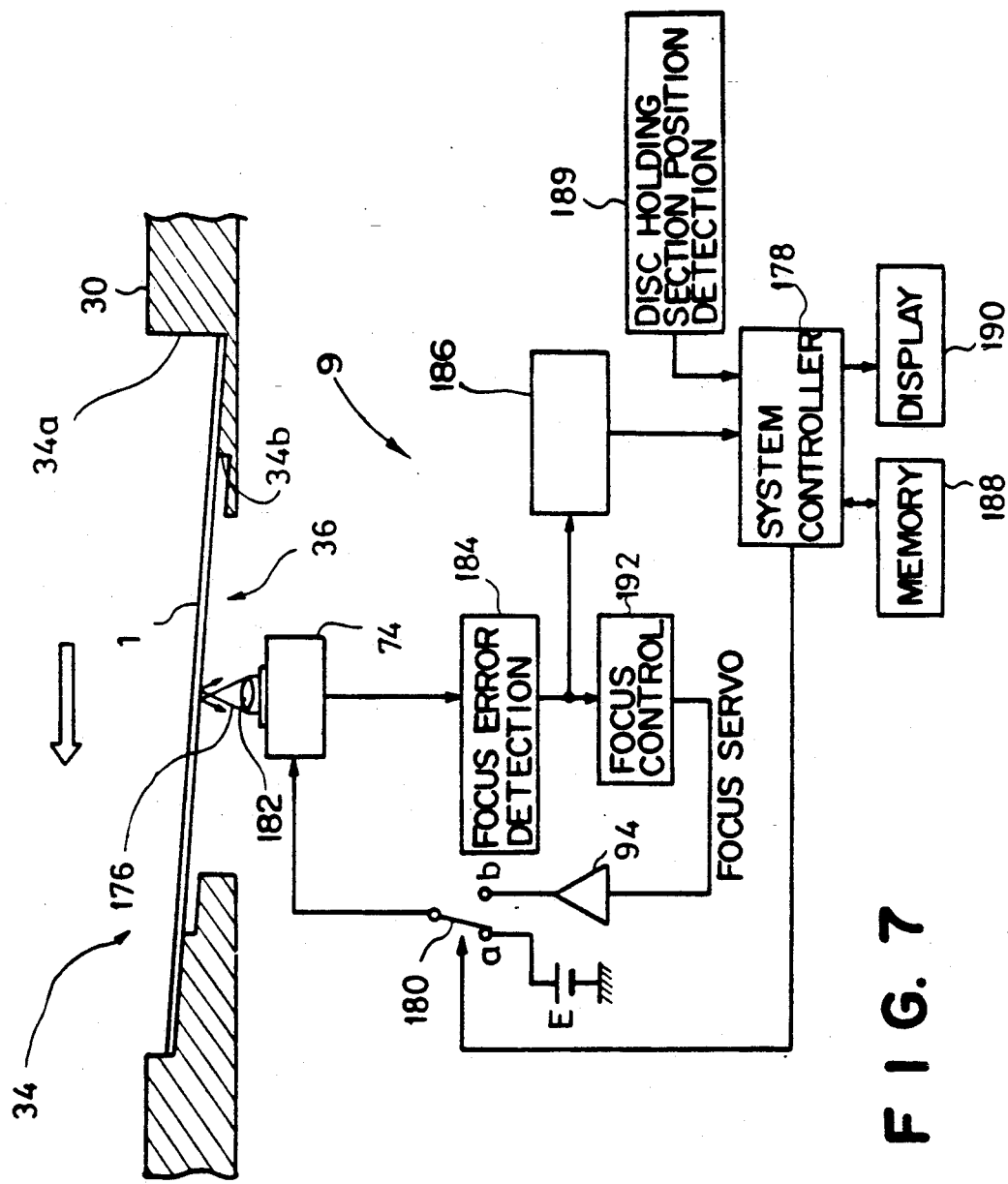
FIG. 7 is a vertical section of an example of a rotary table used in the device and a block diagram showing an example of construction of a disc detection circuit used in the device.

An example of a disc detection device 9 for detecting presence or absence of a disc on the disc holding sections 34 in the disc playback device of FIG. 1 is shown in FIG. 7. The disc holding sections 34 in the rotary table 30 are constructed in such a manner that, as shown in FIG. 7, the depressions 34a and 34b hold a 12 cm CD and an 8 cm CD in an inclined state in the circumferential direction, i.e., the direction of rotation, of the rotary table 30.

For detecting presence or absence of a disc in each disc holding section 34, the reproducing head 74 is positioned at a predetermined height as shown in FIG. 7. For detecting presence or absence of a disc, the discs 1 remain to be held in the respective disc holding sections 34 and are not set on the turtable 72 or clamped by the clamper 46. A switch 180 is connected to a contact a in accordance with a command from a system controller 178 so that a predetermined DC voltage E is applied to a focus actuator in the reproducing head 74 and the height of the objective lens 182 is set at about the middle point of the moving range of the objective lens 182.

Figure 8:
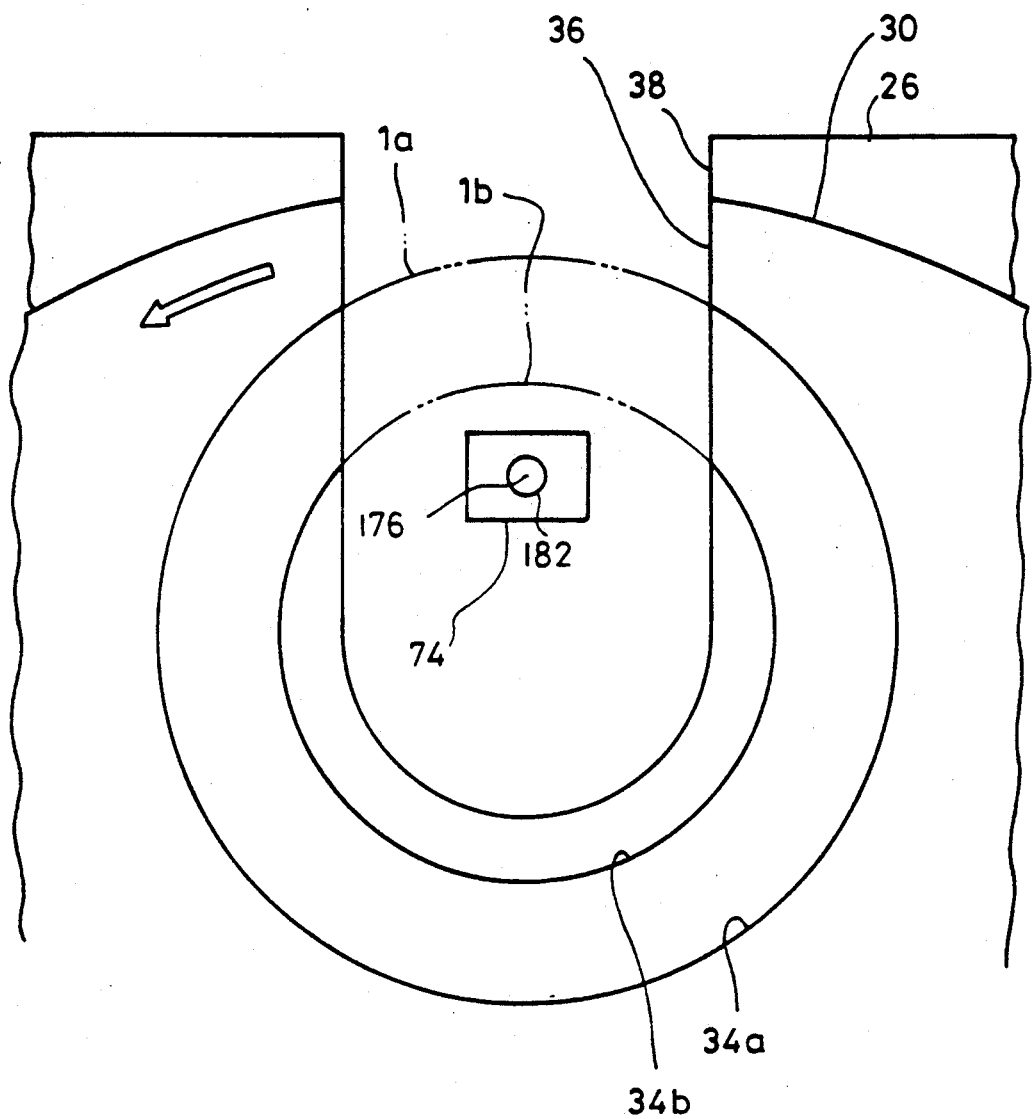
FIG. 8 is a plan view showing a radial position of the reproducing head during detection of a disc.

The height of the reproducing head 74 and the angle of inclination for holding the disc 1 are so determined that laser beam 176 irradiated from the objective lens 182 is focused at any point on the mirror surface portion of a 12 cm CD disposed in an inclined state in the depression 34a of the disc holding section 34 and also at any point on the mirror surface portion of an 8 mm CD disposed in an inclined state in the depression 34b of the disc holding section 34. The position of the reproducing head 74 in the radial direction is so determined that the laser beam 176 from the objective lens 182 is irradiated on the mirror surface portions of the 12 cm CD 1a and the 8 cm CD 1b as shown in FIG. 8.

A beam receiving signal produced from laser beam reflected by the disc 1 and detected by the reproducing head 74 in the disc detection mode is applied to a focus error circuit 184 for detection of a focus error. A disc presence or obsence determining circuit 186 determines presence or absence of a disc on the basis of the focus error signal.

A disc holding section position detection circuit 189 detects which one of the disc holding sections 34 has arrived at the position corresponding to the reproducing head 74 by means of, e.g., position detection notches formed on the lower surface or outer peripheral surface of the rotary table 30 or an encoder connected to the motor for driving the rotary table 30. The system controller 178 stores the result of determination in a memory 188 and displays, on a display 190, presence or absence of a disc in the respective disc holding sections 34.

In the playback mode, the switch 180 is connected to a contact b and a focus control signal is generated by a focus control circuit 192 in response to the focus error signal. This signal is supplied to a focus actuator (not shown) through a servo amplifier 194 whereby the focus servo is performed.

A series of disc detection operations by the disc detection device of FIG. 7 will be described. Any desired number of 12 cm CDs or 8 cm CDs are set in the disc holing sections 34 of the rotary table 30 and the tray 26 is replaced in the main body 28. Then, detection of presence or absence of a disc in each disc holding section is performed before starting playback of the discs. More specifically, the reproducing head 74 is fixed at a predetermined height and at a predetermined position in the radial direction and the switch 180 is connected to the contact ā. The laser beam 176 is irradiated from the objective lens 182 of the reproducing head 74 and the rotary table 30 is rotated by at least 360 degrees.

As each disc holding section 34 passes over the reproducing head 74 by the rotation of the rotary table 30, if the disc 1 is held in the disc holding section 34 passing over the reproducing head 74, the laser beam 176 irradiated from the reproducing head 74 is reflected by the disc surface of the disc 1 and received by the light-receiving element in the reproducing head 74. The focus error detection circuit 184 detects a focus error from the received laser beam and the disc presence or absence determining circuit 186 determines presence or absence of the disc 1 in this particular disc holding section 34.

Since the disc 1 is held in the disc holding section 34 in an inclined state in the direction of rotation of the rotary table 30, the relative distance between the disc surface and the objective lens 182 is gradually decreased and the focus point is passed over at some point on the disc surface.

Figure 9:
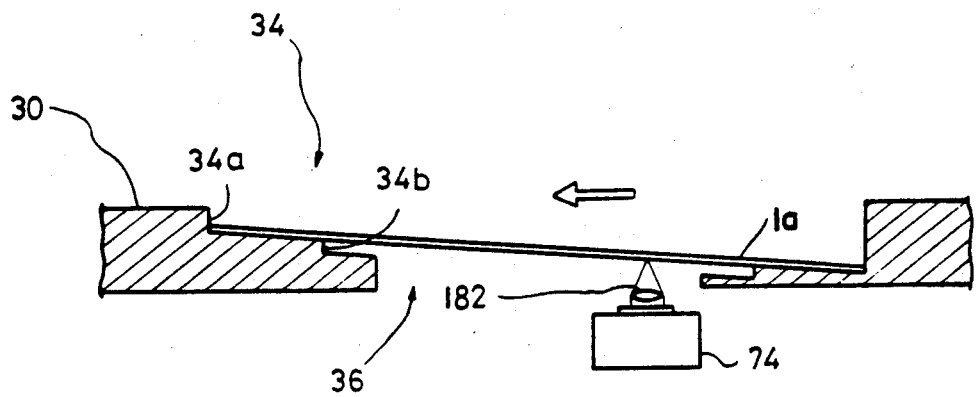
FIG. 9 is a vertical section showing a state in which forming of a focus on a 12 cm Compact Disc has been detected in the device shown in FIG. 7.
Figure 10:
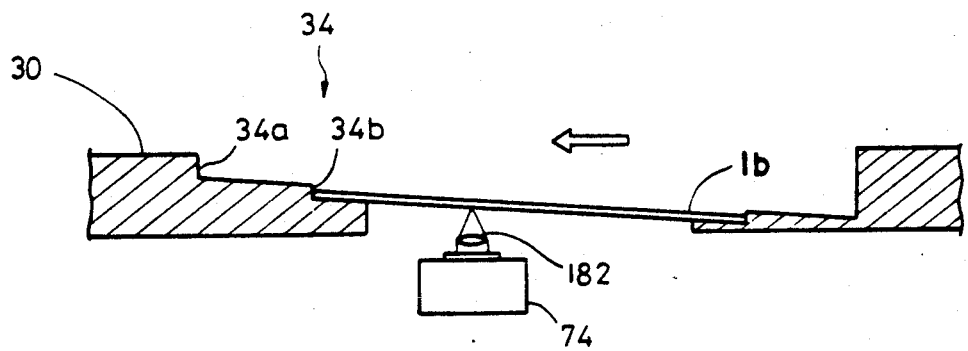
FIG. 10 is a vertical section showing a state in which forming of a focus of an 8 cm Compact Disc has been detected in the device shown in FIG. 7.

In the case of a 12 cm CD, for example, a disc 1a is held in the upper depression 34a as shown in FIG. 9 and, accordingly, the focus point is passed over at a point after the middle point of the opening 36. In the case of an 8 cm CD, a disc 1b is held in the lower depression 34b as shown in FIG. 10 with a result that the relative distance between the disc surface and the objective lens 182 becomes shorter than in the case of a 12 cm CD and, accordingly, the focus point is passed over at a point before the middle point of the opening 36.

Figure 11:
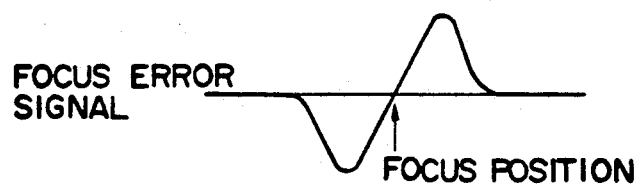
FIG. 11 is a waveform diagram showing change of a focus error signal when a focus has been formed.

When the focus point is passed over, the focus error signal changes in a pattern as shown in FIG. 11. The disc presence or absence determining circuit 186 detects this change pattern of the focus error signal and thereby detects presence of a disc in the particular disc holding section 34. The disc holding section position detection circuit 189 detects which one of the disc holding sections 34 this particular disc holding section is.

If the tracking error signal change pattern as shown in FIG. 11 is not obtained when the disc holding section 34 passes over the reproducing head 74, absence of any disc in this particular disc holding section 34 is detected.

Thus, presence or absence of a disc 1 in all of the disc holding sections 34 is detected while the rotary table 30 is rotated by 360 degrees. This information is stored in the memory 188 and displayed by the display 190. The user therefore can program the order of playback of discs by watching this display.

Upon completion of the programming of playback and depression of the playback key, the rotary table 30 is rotated to position a first selected disc holding section 34 opposite to the reproducing head 74. Then, the turntable 72 is lifted and the disc 1 is set on the turntable 72 (since the angle of inclination is relatively small, the disc 1 can be set on the turntable 72 without difficulty). Upon setting the disc 1 on the turnable 72, the disc 1 is rotated and played back by the reproducing head 74. After completion of playback of the first disc 1, the second and subsequent discs are played back sequentially one after another in the order of the preset program.

In the above described example, the height of the reproducing head 74 is fixed during the disc detection operation. In a case where the focus distance of the objective lens 182 is short, the reproducing head 74 is elevated to a predetermined height only when the reproducing head 74 moves through the recess 36 and the reproducing head 74 is held at a lowered position in other portions of the rotary table 30. By this arrangement, collision of the reproducing head 74 with the rotary table 30 can be prevented.

In the above described example, the relative distance between the disc 1 and the objective lens 182 is changed in the decreasing direction but it may be changed in an increasing direction.

Figure 12:
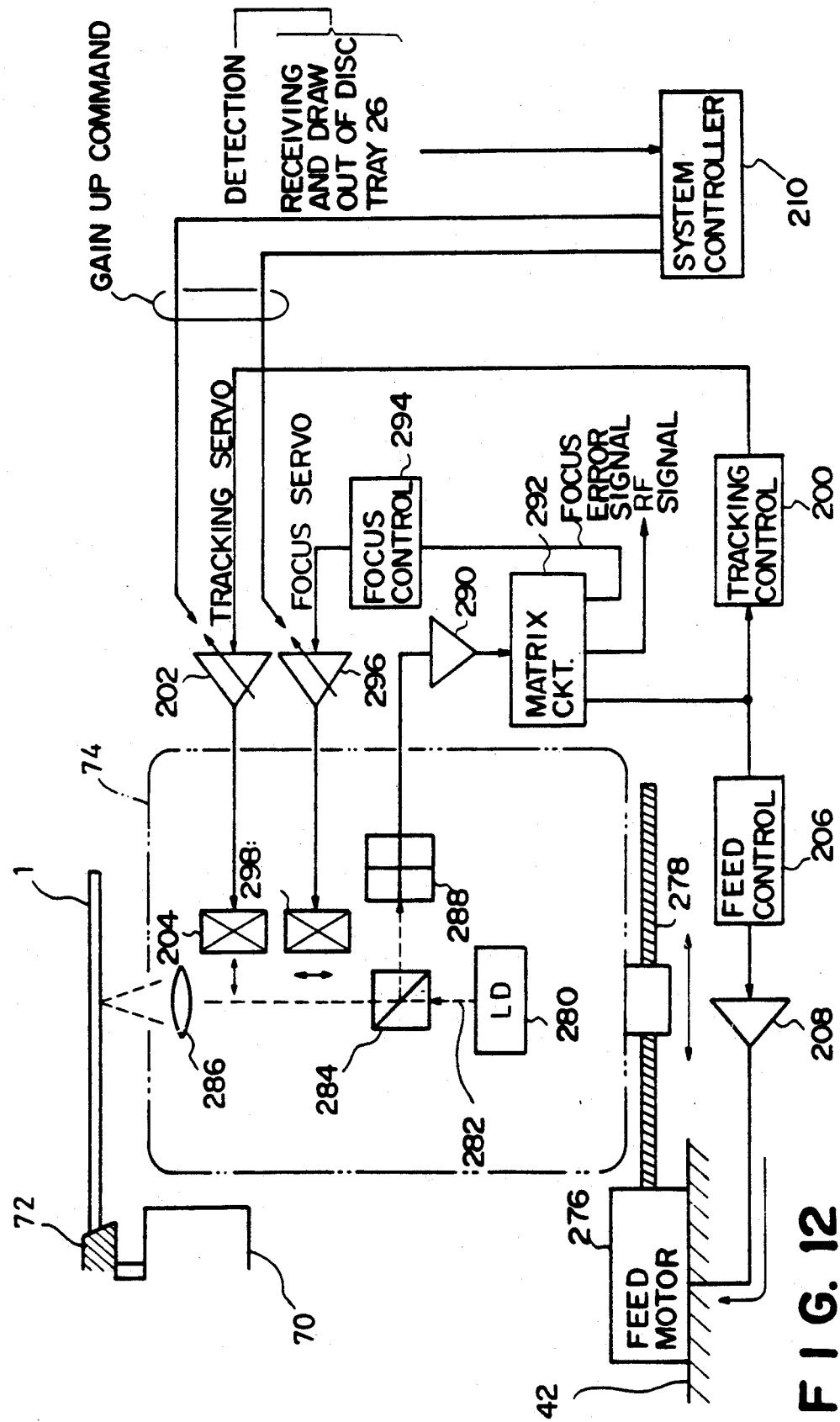
FIG. 12 is a block diagram showing an example of a servo unit used in the device according to the invention.

An embodiment capable of preventing a track jump will now be described with reference to FIG. 12 which shows the device for preventing a track jump applied to the servo system of the disc playback device of FIG. 1. The reproducing head 74 is supported on a motor shaft 278 of a feed motor 276 provided on the sub-chassis 42 slidably in the radial direction of the disc 1.

In the reproducing head 74, laser beam 282 is emitted from a laser diode 280 on the disc 1 through a beam splitter 284 and an objective lens 286 and reflected beam from the disc 1 received by four-divided photo-diodes 288 through the beam splitter 284.

The beam receiving signal from the four-divided photo-diodes 288 is applied to a matrix circuit 292 through an amplifier 290 and the matrix circuit 292 thereupon generates an RF signal, a tracking error signal and a focus error signal. The focus error signal is applied to a focus control circuit 294 which thereupon generates a focus servo signal. The focus servo signal is supplied to a focus coil 298 in the reproducing head 74 through a servo amplifier 296 to perform the focus servo.

The tracking error signal is applied to a tracking control circuit 200 which thereupon generates a tracking servo signal. This tracking servo signal is supplied to a tracking coil 204 in the reproducing head 74 through a servo amplifer 202 to perform the tracking control.

The tracking error signal is applied also to a feed control circuit 206 which thereupon generates a feed servo signal. This feed servo signal is supplied to the feed motor 276 through a servo amplifier 208 to perform the feed servo.

Amplifiers of variable gain are used as the focus servo amplifier 296 and the tracking servo amplifier 202. A system controller 210 detects the tray receiving and drawing out operations for the tray 26 (or tray receiving and drawing out commands) and thereupon increases the gain of the servo amplifiers 296 and 202. By this arrangement, when the disc playback device receives a shock such as vibration due to the movement of the tray 26, occurrence of a track jump caused by unexpected disorder in the focus servo or tracking servo and resulting temporary disableness in reproduction of signals from the disc 1 can be effectively prevented. Upon receiving of the tray 26 in the main body 28, the servo loop gain is restored to a normal value.

If the servo loop gain is maintained at an increased level when the tray 26 is suspended in a drawn out state, occurrence of a track jump due to a shock which, for example, is caused by touching of the user's finger on the tray 26 during replacing of discs can be prevented.

What is claimed is:

1. A disk playback device comprising:
   a main body of the disc playback device;
   a table formed with a plurality of disc holding sections in which a disc on which information is reproduceably recorded can be detachably held, wherein each holding section includes a recess formed therein;
   table moving means for moving said table relative to said main body for being received in and drawn out of said main body;
   a reproducing portion provided in said main body separately from said table moving means for reproducing the information recorded on said disc;
   wherein said table is moved into the main body to position one of the disc holding sections near the reproducing portion to allow a disc to be detached from the holding section and played back by the reproducing portion and wherein said table is drawn out of the main body while the disc is being played back by keeping clear of the reproducing portion through the recess of the respective holding section.

2. A disc playback device as defined in claim 1 wherein said table is formed as a circular table having a plurality of disc holding sections and which further comprises partial rotation means for rotating said table partially about the center of the table.

3. A disc playback device as defined in claim 2 wherein said table moving means comprises a tray on which said table is rotatably mounted and a driving portion for moving said tray for being received in and drawn out of said main body and which further comprises an opening formed in said tray communicating with said recess of said disc holding section in a disc playback position.

4. A disc playback device as defined in claim 3 wherein said reproducing portion comprises a turntable, a disc clamper and a reproducing head provided in said main body separately from said tray and which further comprises disc mounting means for setting a disc held in one of said disc holding sections on said turntable and clamping said disc by said disc clamper in a state where said tray is received in said main body.

5. A disc playback device as defined in claim 2 further comprising locking means for preventing rotation of said table when said tray has been drawn out of said main body.

6. A disc playback device as defined in claim 5 wherein said locking means comprises a worm fixed to a motor for driving said rotary table and a gear wheel meshing with said worm and connected to said rotary table.

7. A disc playback device as defined in claim 4 wherein said main body comprises a chassis and a sub-chassis carrying said turntable and said reproducing head and being pivotably mounted on said chassis at a position under said tray.

8. A disc playback device as defined in claim 7 wherein said clamper is fixedly mounted on said chassis at a position above said tray and opposite to said turntable.

9. A disc playback device as defined in claim 4 wherein each of said disc holding sections is constructed in such a manner that a disc is held in an inclined state in the circumferential direction of said table and an objective lens of said reproducing head is positioned at a height at which a focus is formed at some point on the surface of the disc when said table is rotated whereby presence or absence of a disc in each of said disc holding sections is detected by whether a focus has been formed or not when the disc holding section passes over said reproducing head by the rotation of said table.

10. A disc playback device as defined in claim 9 wherein each of said disc holding sections consists of a depression formed in said rotary table.

11. A disc playback device as defined in claim 9 wherein said disc is an optical disc.

12. A disc playback device as defined in claim 11 wherein each of said disc holding sections has depressions for holding different types of discs having diameters which are different from each other.

13. A disc playback device as defined in claim 12 wherein said reproducing head is elevated to a predetermined height only when said reproducing head moves through said recess formed in said disc holding section and said reproducing head is held at a lowered position at times other than when the reproducing head moves through the recess, thereby preventing collision of the reproducing head and the table.

14. A disc playback device as defined in claim 1 further comprising:
   an amplifier of variable gain provided in a pickup servo loop for controlling a position of said reproducing portion;
   detection means for detecting starting of an operation for moving said table relative to said main body; and
   control means for controlling, responsive to a detection signal from said detection means, said amplifier so as to increase its gain.

15. A disc playback device as defined in claim 14 wherein said amplifiers consist of a focus servo amplifier and a tracking servo amplifier.

16. A disc playback device as in claim 1 wherein said table moving means can draw the table out of the body by an amount sufficient to enable a disc to be placed on or removed from all of the disc holding sections other than the one corresponding to the disc being played without further movement of the table.

* * * * *